Inventor
Sidney T. Carter
by [signature]
Att'ys.

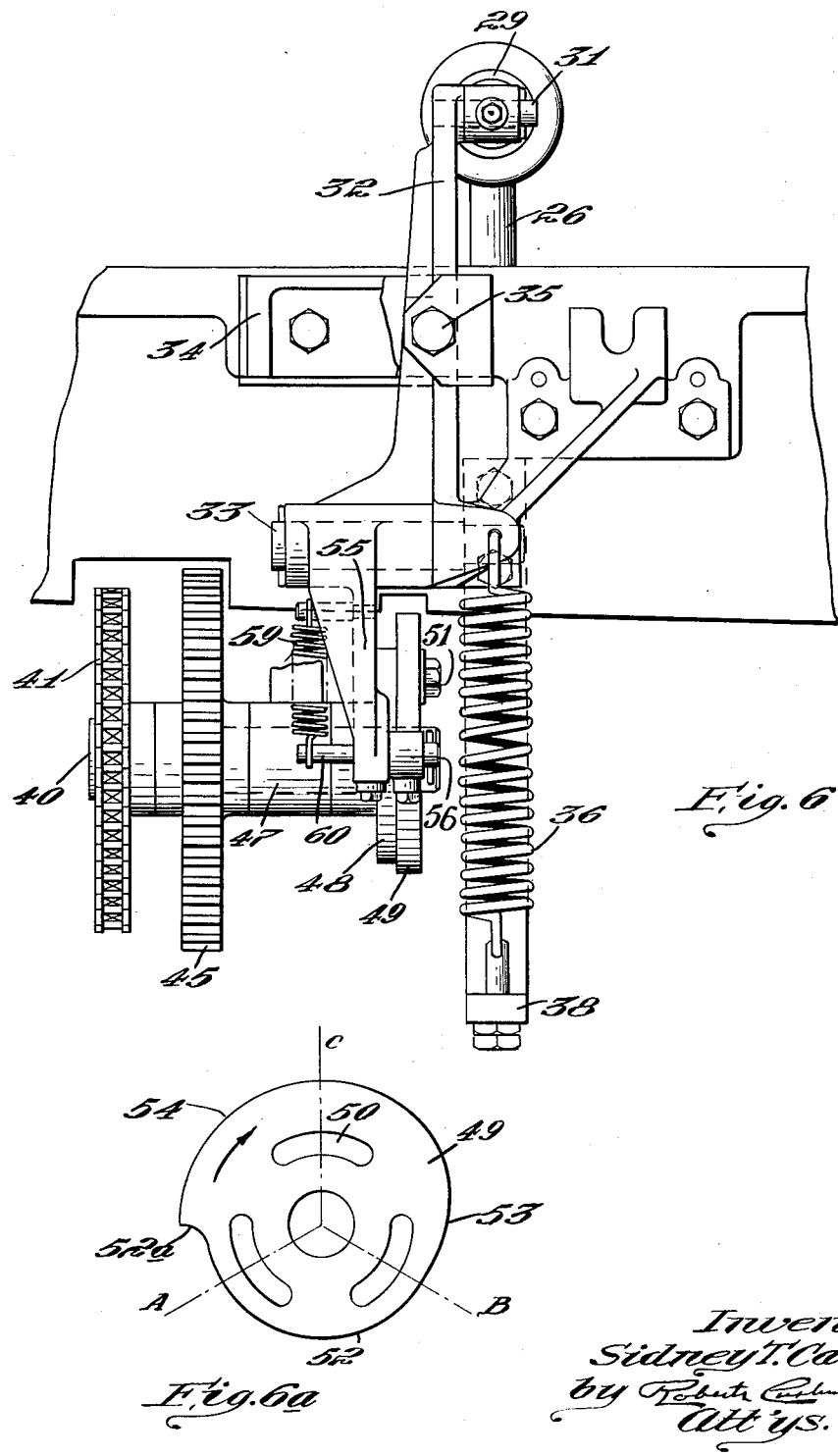

Oct. 6, 1953 S. T. CARTER 2,654,497
BELLOWS MECHANISM FOR PNEUMATIC TRANSFER
PADS FOR LABELING MACHINES
Filed Feb. 24, 1951 8 Sheets—Sheet 7

Inventor
Sidney T. Carter
by Roberts Cushman & Grover
Att'ys.

Oct. 6, 1953          S. T. CARTER         2,654,497
BELLOWS MECHANISM FOR PNEUMATIC TRANSFER
PADS FOR LABELING MACHINES

Inventor
Sidney T. Carter
by Roberts Cushman & Grover
Att'ys

Patented Oct. 6, 1953

2,654,497

UNITED STATES PATENT OFFICE 2,654,497

BELLOWS MECHANISM FOR PNEUMATIC TRANSFER PADS FOR LABELING MACHINES

Sidney T. Carter, Worcester, Mass., assignor to Geo. J. Meyer Manufacturing Co., Cudahy, Wis., a corporation of Wisconsin Application February 24, 1951, Serial No. 212,563

14 Claims. (Cl. 216—54)

This invention relates to labeling machines and more especially to means for establishing label-holding suction at a pneumatic transfer pad designed to receive a label from a gum-coated picker and to transfer it to the article to be labeled, the present invention constituting an improvement upon the apparatus described in the patent to Carter 2,528,944, dated November 7, 1950.

In accordance with said Carter patent, the pump which creates the vacuum at the transfer pad is actuated by a rock shaft whose primary function is to separate the picker elements at the proper time to permit the transfer pad carrying the label to pass between them. In the commercial use of the machine disclosed in said patent particularly when run at high speed, it has been found that the pump does not always establish a sufficient degree of suction before the picker elements begin to separate and that in consequence the label may not be taken from the picker by the transfer pad, or if it be removed from the picker, it may be dropped during transfer.

The principal object of the present invention is to provide improved means for actuating the vacuum-creating pump so as to provide for the establishment of sufficient vacuum at the transfer pad, under all conditions of operation, to insure the proper taking of the label by the transfer pad and its retention by the pad while it is being transferred to the article. A further object is to provide improved means whereby a pump of the bellows type may be caused to establish maximum vacuum at the transfer pad at the instant at which the pad is brought into transfer relation to the picker and before the picker elements begin to separate. A further object is to provide pump actuating means comprising relatively adjustable parts whereby the time at which the pump establishes the maximum vacuum may be accurately determined relatively to the cycle of movement of other parts of the labeling machine. A further object is to provide vacuum-creating means of simple and inexpensive type capable of application to existing machines without substantial modification of the other operative elements of the latter. Other and further objects and advantages of the invention will be pointed out in the following more detailed description and by reference to the accompanying drawings wherein:

Fig. 6 is a front elevation of the parts shown in Fig. 5, looking from the left-hand side of the latter figure;

Figure 2:
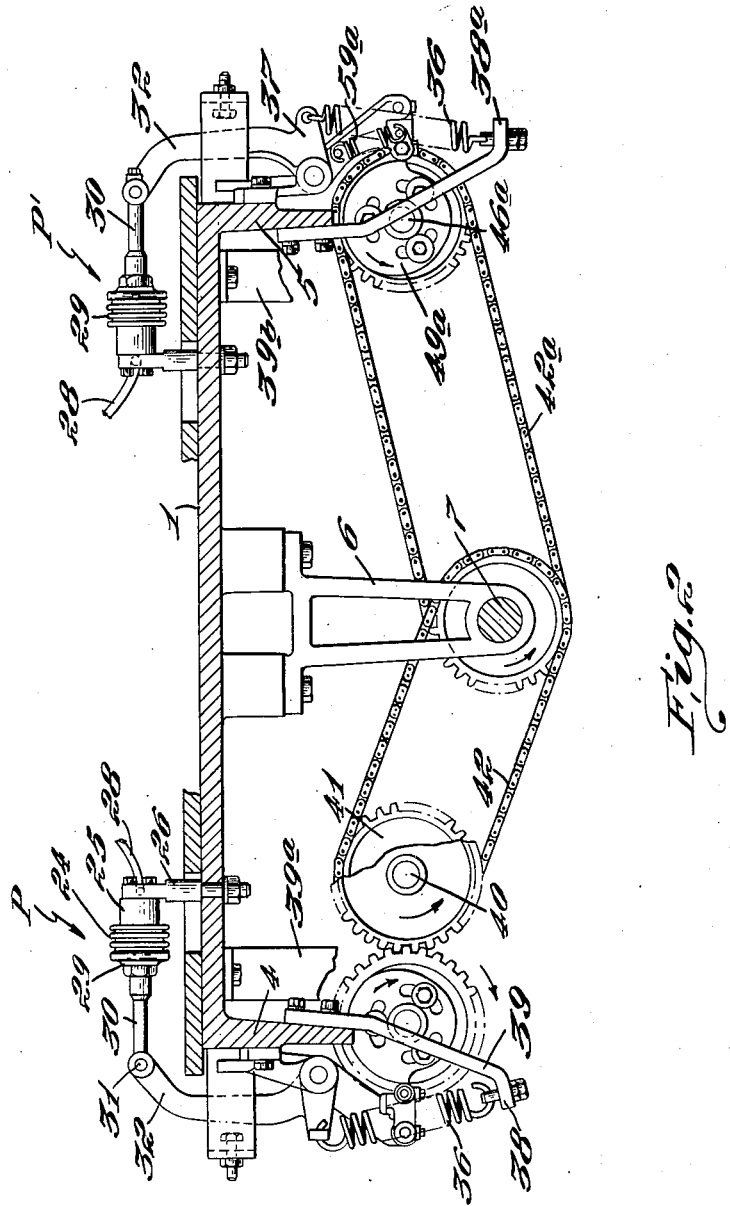
Fig. 2 is a vertical section, looking from the opposite end of the machine, omitting the label manipulating parts but showing the pump-actuating mechanism of the present invention as it may be applied to an existing machine of the Ekval type.
Figure 8:
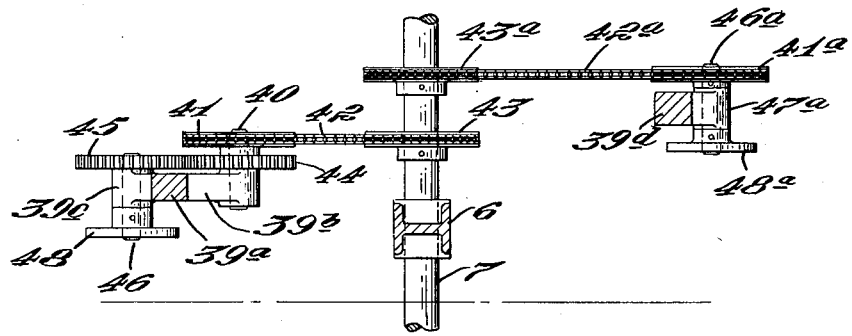
Figure 9:
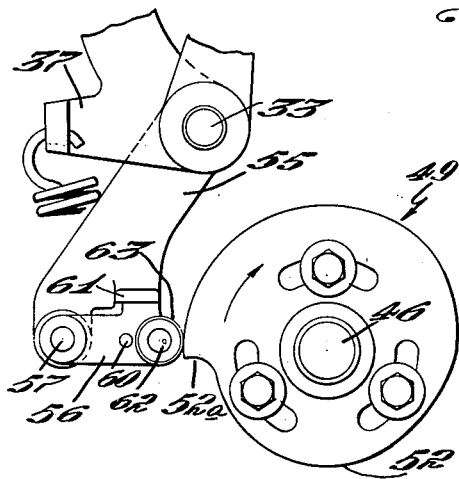
Figure 10:
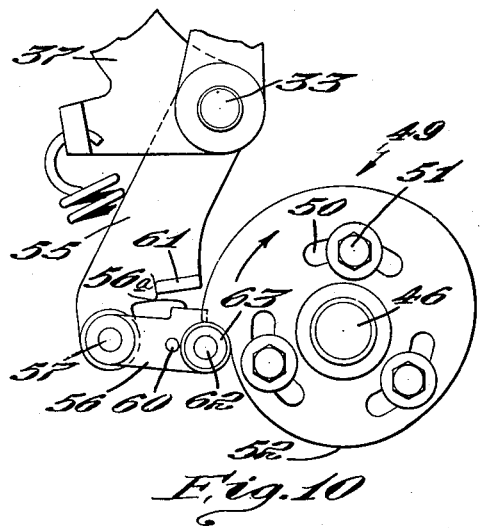
Figure 11:
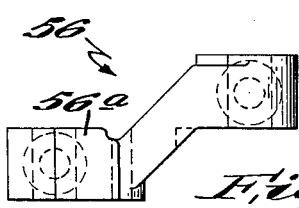
Figure 12:
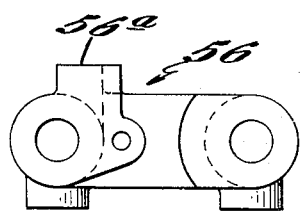
Figure 15:
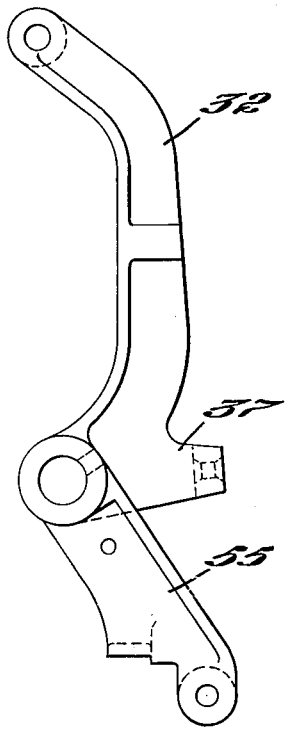

Fig. 6$^a$ is a face view of one of the pump-operating cams;

Fig. 7 is a fragmentary rear view of the pump shown at the left-hand side of Fig. 2 with its actuating lever and the cam for operating it;

Fig. 8 is a fragmentary plan view illustrating the means for transmitting motion from the main shaft to the two pump-actuating cams of Fig. 2;

Fig. 9 is a front elevation of one of the pump-actuating means showing the relative position of the motion-transmitting parts while the pump is in fully contracted position;

Fig. 10 is a view similar to Fig. 9, but showing the position of the parts at the instant at which the pump begins to expand;

Fig. 11 is a plan view of the link which supports the cam follower roll;

Fig. 12 is an elevation of the link of Fig. 11;

Fig. 13 is a front elevation of one of the pump-actuating levers; and

Figure 14:
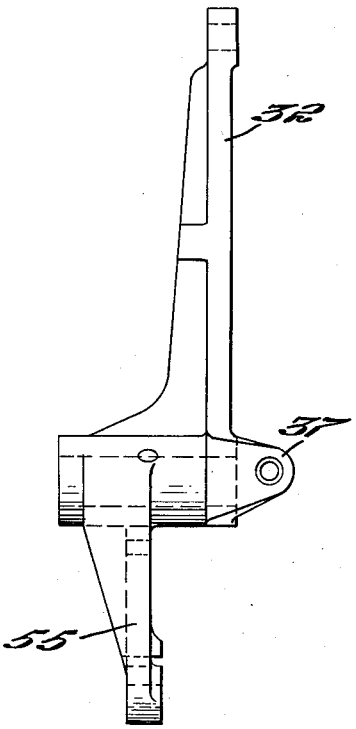

Fig. 14 is a side elevation of the lever of Fig. 13.

Referring to the drawings, the numeral 1 designates the table of a conventional labeling machine of the kind, for example, shown in the patent to Ekval above referred to, but having a pneumatic type transfer pad such as described in the above named patent to Carter. This table 1, as shown in Fig. 2, is provided with downwardly directed lateral flanges 4 and 5 and may be supported upon suitable legs (not shown) at the desired distance above the floor. For the purpose of the following description it will be assumed that the table supports, sets of pickers and transfer pads operative respectively to apply labels to the opposite sides of a bottle, and with this possibility in view the mechanism hereafter to be described provides for the actuation of two independent pumps, one for creating suction at one of the pneumatic transfer pads and the other for creating suction at the second pneumatic transfer pad. Thus, as shown in Fig. 2, the table supports two pumps P and P' with mechanism according to the present invention for actuating each of them.

As illustrated in Figs. 2 and 8, the table 1 is provided with a downwardly directed bracket 6 at its underside, this bracket being substantially midway between the front and rear edges of the table and carrying bearings for a main drive shaft 7 which extends longitudinally of the machine and on which are mounted the cams 8, 9, 10 and 11 (Fig. 1) for actuating the label picking and applying devices, the cam 10 being the one which moves the picker blades toward and from each other, thus corresponding in function to the cam 33 of the above Carter patent.

Figure 1:
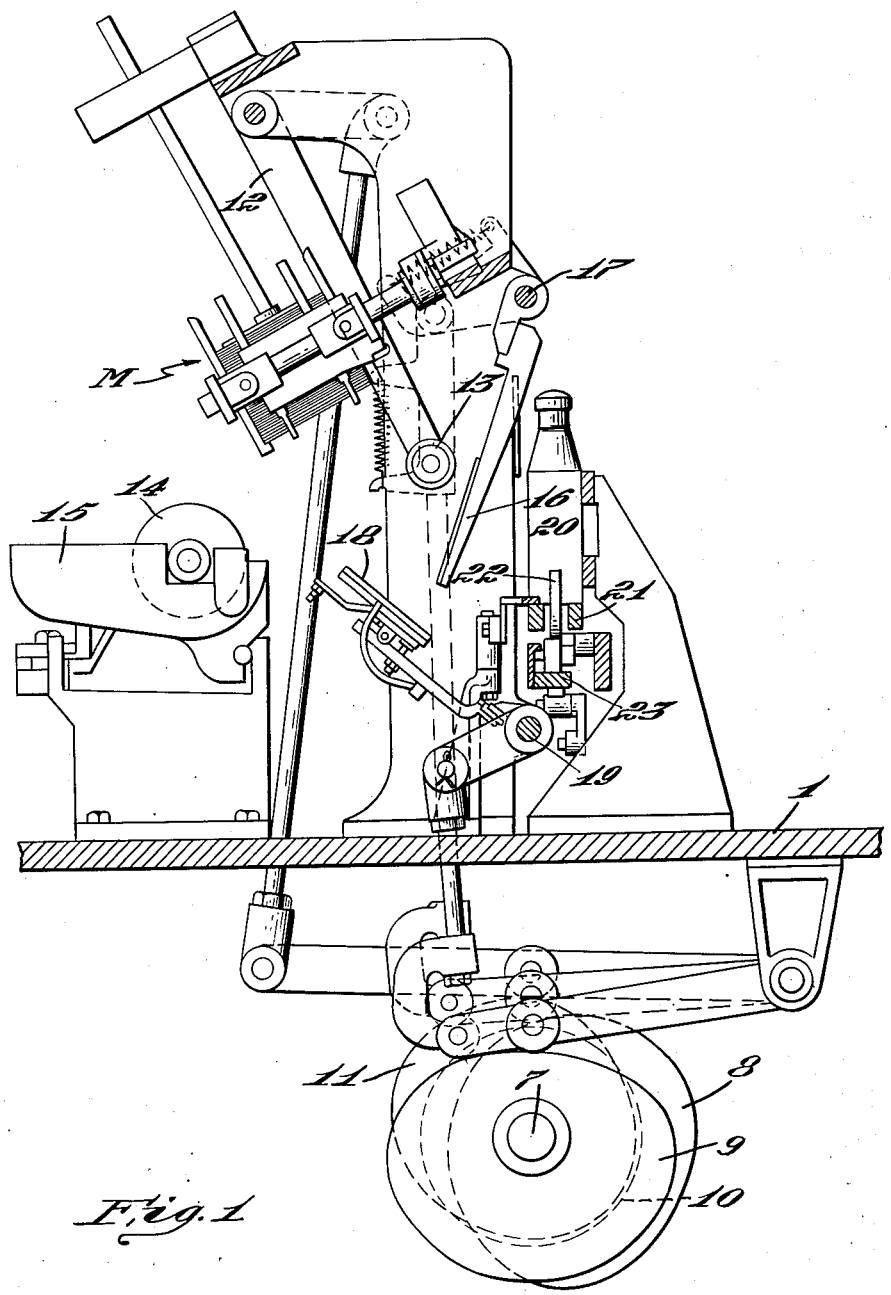
Fig. 1 is a fragmentary, vertical, transverse section, with parts omitted, looking from the feed end of a labeling machine of the general type disclosed in the patent to Ekval 1,630,235, dated May 24, 1927, showing the mechanism of the present invention applied thereto.

As shown in Fig. 1, in which but a single picking and labeling unit is illustrated, and which is designed to apply the label to the rear face of the bottle, this single unit of label-applying means comprises, among other things, a swinging arm 12 carrying a roll 13 at its lower end which is designed to swing into contact with a gum-carrying roll 14 mounted in a gum box 15 and to transfer adhesive from the roll 14 to the face of a picker device 16 arranged to swing about the axis of a shaft 17. This picker device is of the kind illustrated, for example, in the above patent to Carter—comprising two independent picker elements which are movable relative to each other axially of the shaft 17, and which, at times, are in edge-to-edge relation and at other times separated. This label-applying unit also comprises the pneumatic type transfer pad 18 which swings about a pivot shaft 19 and which is designed to receive a label from the picker and to transfer it to and apply it to the side of the bottle 20, the latter resting upon rails 21 along which it is moved by a dog 22 actuated by a feed bar 23. The cams for actuating the picker 16 and the transfer pad 18 are so designed that after the picker has received its coating of adhesive and has moved up to the magazine M to take a label from the latter, the picker and transfer pad 18 are moved to a transfer position in which their surfaces are substantially parallel and closely adjacent so that suction created at the transfer pad 18 will grip a label held by the picker and hold the label while the separable picker elements slide laterally apart, leaving the label adhering to the transfer pad the latter then moving forwardly between the separated picker elements to place the label on the bottle. It will be understood that if a label is to be placed on the opposite face of the bottle, a similar labeling unit will be provided for that purpose.

The transfer pad 18 is of conventional form, having a label contacting plate provided with a plurality of small suction orifices which communicate with a chamber at the interior of the transfer pad, this chamber in turn being connected by a flexible conduit to an appropriate source of subatmospheric pressure, this source, according to the present invention, being an air pump P.

Any simple form of pump may be employed, for example, a conventional cylinder and piston pump, but as here illustrated the pump is of the bellows type, for example one having a bellows of rubber, thin metal, or other suitable material. Thus, referring to Figs. 2 and 5 the pump P comprises the bellows 24 having a fixed head 25 at one end which is mounted on a bracket 26 carried by the table 1, the bracket 26 having a passage which connects with the interior of the bellows and having provision for the attachment of a flexible conduit 28 which leads to the corresponding transfer pad 18. The movable head 29 of the bellows is connected to a rigid link 30 whose opposite end is pivotally connected at 31 to an upwardly directed arm 32 of a lever which is pivoted at 33 on a bracket 33ª carried by the flange 4 of the table. In order to limit movement of the lever arm 32 in a counterclockwise direction which would expand the bellows, a bracket 34 is mounted on the outside of the flange 4 and carries an adjustable stop member 35 engageable with the outer edge of the lever arm 32. By this means over-expansion and damage to the bellows is prevented.

A strong tension spring 36 is connected at its upper end to another arm 37 of the lever, and at its lower end is connected at 38 to a rigid arm 39 secured to the inner surface of the flange 4 and extending downwardly to a point below but substantially spaced from the pivotal axis 33 of the lever. A bracket 39ª is secured to the underside of the table adjacent to the flange 4 and extends downwardly (Fig. 8) to a point below the lower edge of the flange 4 where it is provided with a horizontal part 39ᵇ having a bearing for a jack shaft 40 which is parallel to the drive shaft 7. A sprocket wheel 41 is fixed to the shaft 40 and is engaged by a chain 42 which embraces a sprocket wheel 43 on the shaft 7. The sprocket wheels 41 and 43 are of the same size so that the shaft 40 turns in one-to-one ratio to the shaft 7. A gear 44 is fixed to the shaft 40 and meshes with a gear 45 of the same size which is fixed to a shaft 46 parallel to the shaft 40 and turning in bearings 47 (Fig. 6) carried by a part 39ᶜ (Fig. 8) of the bracket 39ª. A disk member 48 (Figs. 6 and 8) is fixed to a shaft 46 and to this disk is secured a cam 49 (Fig. 6). This cam is provided with arcuate slots 50 (Fig. 6ª) which receive bolts 51 (Figs. 5 and 6) having threaded engagement with the disk 48. By this means the cam 49 may be rotatably adjusted relatively to the disk 48, so as to provide for initial timing of the pump operating devices. As illustrated in Fig. 6ª, the cam 49 comprises a substantially concentric dwell portion 52 extending from the radial line A to the radial line B; a riser portion 53 extending from the radial line B to the radial line C, and a second concentric dwell portion 54 extending from the radial line C toward the line A but terminating at a steep drop portion 52ª extending inwardly from the terminus of the dwell 54 to the beginning of the dwell 52, the cam turning in the direction of the arrow (Fig. 6ª). The drop portion 52ª may be radial, though as here shown it is concavely curved with a very steep slope at its outer part and merging gradually with the dwell 52 at its inner part.

The lever 32 above described, which is pivoted at 33, has a third arm 55 extending downwardly from the pivot axis and on this arm is pivotally mounted a latch member 56 carried by the pivot pin 57. A spring 59, attached at its upper end to the arm 55 and at its lower end to a pin 60, projecting from the latch tends to swing the latch about the pin 57 in a counterclockwise direction, as viewed in Fig. 5. The free end portion of the latch has a flat abutment face 56ª which, by engagement with a rigid stop 61 carried by the lever arm 55 limits movement of the latch by spring 59. The free end of the latch 56 is provided with a pivot pin 62 on which is mounted a cam follower roll 63 which engages the peripheral edge of the cam 49. When the latch 56 engages the stop 61 as shown in Fig. 9, the pivotal axes of the pins 57 and 62 are in a horizontal plane slightly above the horizontal plane of the axis of the shaft 46 so that the pressure exerted by the cam tends to keep the abutment surface 56ª of the latch 56 in contact with stop element 61.

Figure 5:
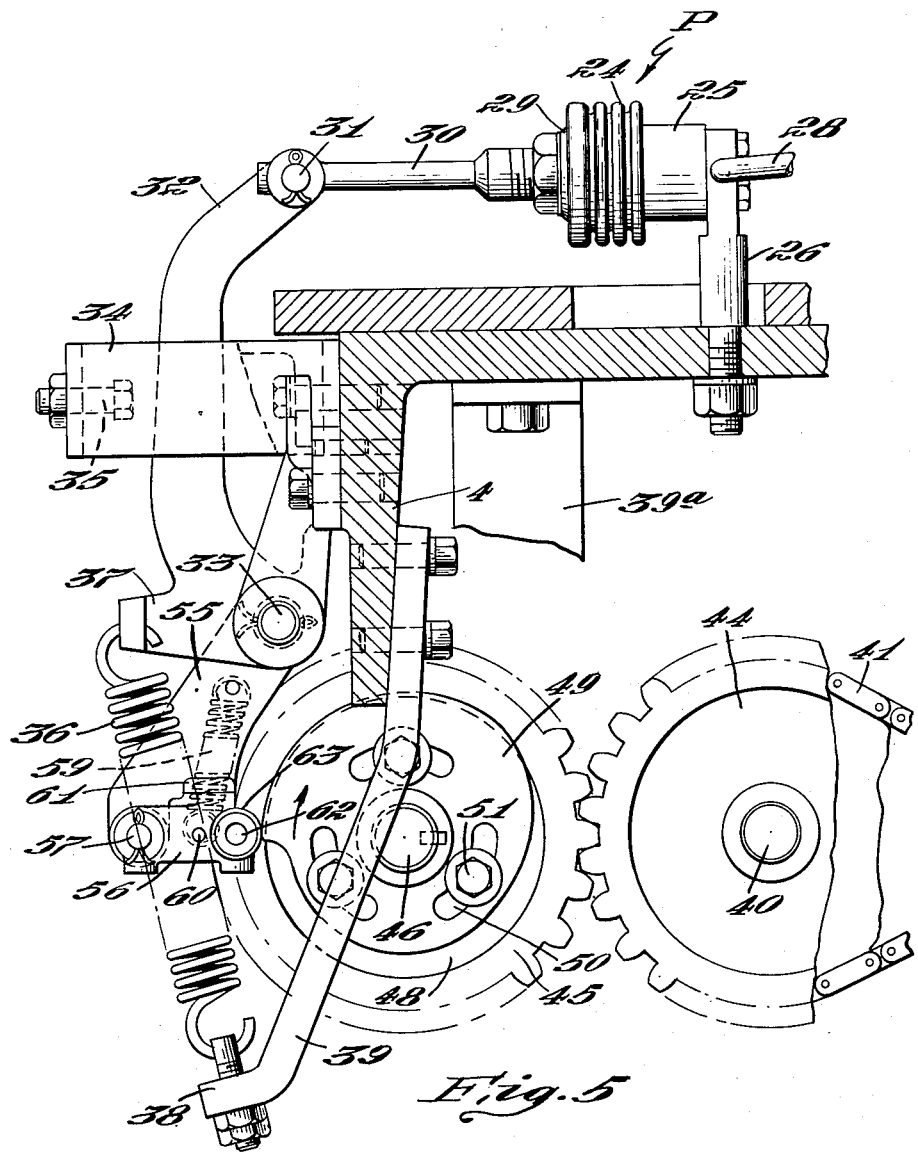
Fig. 5 is a view similar to Fig. 3, but showing the pump arranged at the front of the machine.

While the roll 63 engages the dwell portion 54 of the cam 49, as shown in Fig. 5, the spring 36 is unable to expand the bellows 24, the latter being in its most contracted condition. The cam 49 turns in the direction indicated by the arrow (Figs. 5 and 9) that is to say in a clockwise direction, and when the roll 63 reaches the end of the dwell portion 54 it moves down along the drop portion 52ª of the cam, permitting the spring 36 suddenly to expand the bellows 24 to its maximum extent, the maximum expansion of the bellows being determined by the adjustable stop member 35. In order to insure a very sudden inward movement of the roll 63 when it reaches the radial part 52ª of the cam, the roll is mounted on the latch member 56 as above described. Instantly the corner of the cam (at the junction of the surfaces 54 and 52ª) passes above the horizontal plane of the pivot pins 57 and 62, the force exerted by the spring 36 in pressing the roll 63 against the cam develops a downward component which swings the latch 56 in a counterclockwise direction, the parts 56ª and 61 separating, so that the effective length of the latch is thereby shortened and the distance between the axis of the pin 57 and the axis of the shaft 46 is lessened by an amount greater than would result from the normal radial movement of the roll 63 into contact with the dwell 52 with the initial angularity of parts 55 and 56 maintained. Thus a very sudden motion of the bellows takes place, instantaneously creating the maximum suction at the transfer pad. The cam 49 is so adjusted that this sudden expansion of the bellows takes place just as the transfer pad and picker arrive at the transfer position, and thus the maximum suction is created for holding the label to the transfer pad before the picker elements begin to separate. Thus there is no danger that the transfer pad will fail to take the label or that the label will not be held properly by the transfer pad while the latter is moving it from the transfer position to the label-applying position.

The dwell 52 of the cam 49 is of sufficient extent to maintain the suction until the label has been applied to the bottle. The roll 63 then begins to climb the riser portion 53 of the cam, thereby swinging the lever arm 32 in a clockwise direction and thus gradually compressing the bellows so as to break the suction, the bellows remaining in its collapsed position from the time the roll 63 reaches the dwell 54 of the cam until the roll again arrives at the drop portion or shoulder 52ª of the cam whereupon the cycle of operations is repeated.

Figure 3:
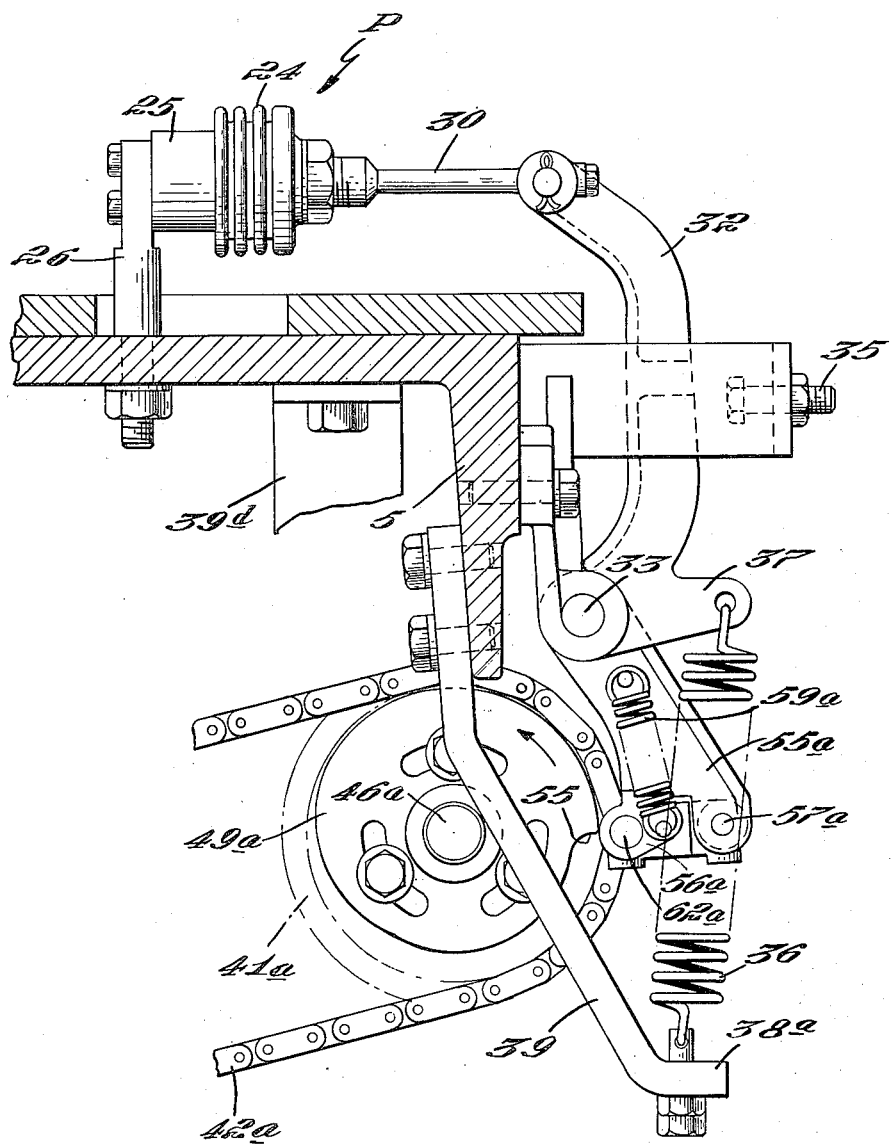
Fig. 3 is a fragmentary view, to larger scale, and on the same vertical plane as Fig. 2, showing a bellows-type pump arranged at the back of the machine.
Figure 4:
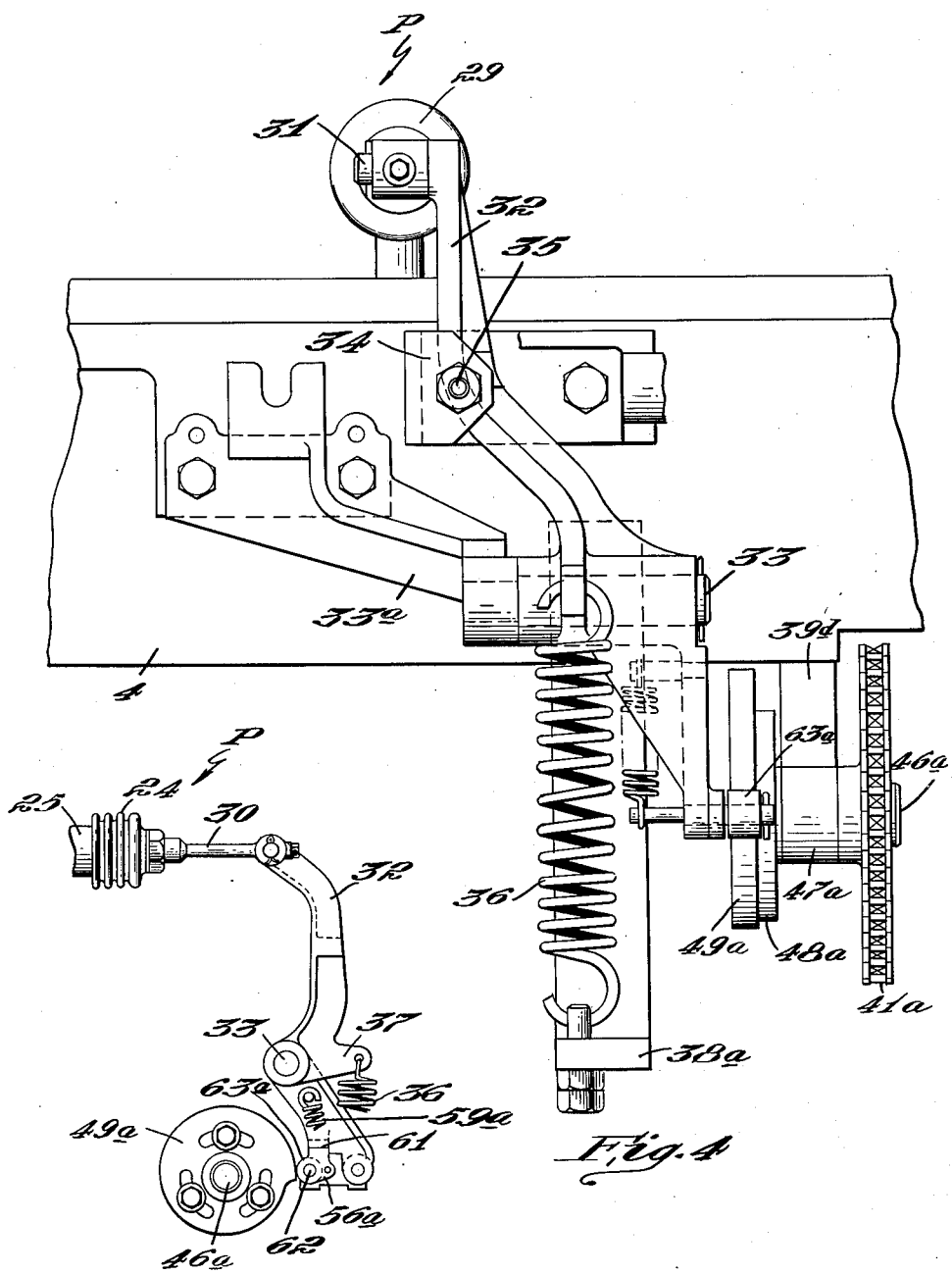
Fig. 4 is a fragmentary elevation of the parts shown in Fig. 3, looking from the right-hand side of the latter figure.

As above stated, the invention is illustrated as embodied in a machine having two label-applying units, and for this purpose it has the second pump P' (Fig. 2) which is connected to the other transfer pad. This pump P' is in all respects similar to the pump P above described, the movable head of the pump being connected by the rigid link 30 to the upstanding arm 32 of the corresponding operating lever. As shown more particularly in Figs. 3, 4 and 8, a bracket 39ᵈ corresponding to the bracket 39ª above described, extends downwardly below the table adjacent to the flange 5 and at its lower end supports a bearing 47ª for a shaft 46ª to one end of which is secured a sprocket wheel 41ª about which is trained a chain 42ª which passes around a sprocket wheel 43ª on the shaft 7. The parts are so arranged that the shaft 46ª turns in one-to-one ratio to the shaft 7. The shaft 46ª carries a disk member 48ª to which is secured a cam 49ª with provision for adjustment as above described, this cam being identical in contour with the cam 49 except that it is arranged in reverse position since the shaft 46ª turns oppositely to the shaft 46 which carries the cam 49. A cam follower roll 63ª engages the peripheral edge of the cam 49ª, this roll being carried by a latch member 56ª whose roll-carrying end is urged upwardly by a spring 59ª. A spring 36, like that above described, which is anchored at its upper end to the lever arm 37 and at its lower end to a part 38ª tends to swing the lever 32 in a clockwise direction, thereby to expand the bellows 24 of the pump P', the collapse of the bellows being accomplished by the action of the cam 49ª.

The arrangement of the parts, as shown in Fig. 2, is such that the maximum vacuum of the transfer pads of the two labeling units will occur at the same instant, this being on the assumption that the two labeling units will operate simultaneously, but it will be understood that if the transfer pads of the two labeling units are to be operated in a differently timed relation, the cams 49 and 49ª will be correspondingly adjusted to assure the proper timing.

It will further be understood that if but one labeling unit is to be employed, one of the pumps P or P' with its operating mechanism will be omitted.

While one desirable embodiment of the invention has been illustrated by way of example, it is to be understood that the invention is broadly inclusive of any and all modifications and arrangements of parts falling within the scope of the appended claims.

I claim:

1. In combination, in a labeling machine of the kind which has an adhesive type picker comprising two laterally separable elements, a pneumatic transfer pad, a driven shaft, and means actuable thereby for moving the pad and picker through an operative cycle during which they dwell in substantial contact at a transfer point while the transfer pad receives a label from the picker, and having means for separating the picker elements after transfer and for moving the pad between said separated picker elements with the label adhering to the pad by suction, suction-creating means moving in accurately timed relation to said driven shaft and operative suddenly to create maximum suction at the transfer pad substantially at the instant at which the pad arrives at the transfer position and before the picker elements separate.

2. In combination, in a labeling machine of the kind which has an adhesive type picker comprising two laterally separable elements, a pneumatic transfer pad, a driven shaft, and means actuable thereby for moving the pad and picker through an operative cycle during which they dwell in substantial contact at a transfer point while the transfer pad receives a label from the picker, and having means for separating the picker elements after transfer and for moving the pad between said separate picker elements with the label adhering to the pad by suction, suction-creating means operative substantially instantly to create maximum suction at the transfer pad, and means for adjusting said suction-creating means thereby accurately to determine the point in the cycle of movement of the transfer pad and picker at which maximum suction at the transfer pad shall be established.

3. In a labeling machine of the kind which has an adhesive type picker comprising two laterally separable elements, a pneumatic transfer pad, a driven shaft and means actuable thereby for moving the pad and picker through an operative cycle during which they dwell in substantial contact at a transfer point while the transfer pad receives a label from the picker, and having means for separating the picker elements after transfer and for moving the pad between said separate picker elements with the label adhering to the pad by suction, in combination suction-creating means comprising a pump having a movable part, a spring tending to move said part in one direction, a cam which turns in accurately timed relation to the drive shaft, for determining the time in the cycle of operation of the picker and transfer pad at which said part may be moved by the spring, and motion-transmitting means controlled by the cam, the cam and said motion-transmitting means being so constructed and arranged that the pump establishes maximum suction just as the transfer pad and picker arrive at the transfer point and before the picker elements begin to separate.

4. Suction creating means for use in creating suction at a suction pad designed to pick up a part by suction action at a transfer point at which the suction pad dwells temporarily, the suction pad being moved by appropriate actuating means from the transfer point to a delivery point and back to the transfer point, cycle after cycle, and wherein suction is periodically created at the pad by a pump, the pump having a reciprocable element which forms one wall of an expansible chamber which communicates, by means of a conduit, with the suction pad, in combination pump-actuating means including a part, moving in accurately timed relation to the pad-actuating means, operative suddenly to move the reciprocable element of the pump through its maximum path of travel and thereby substantially instantaneously to create maximum suction, and means for adjusting the pump-actuating means thereby to insure such sudden movement of the reciprocable pump part just as the suction pad arrives at the transfer position.

5. Suction creating means for use in creating suction at a suction pad designed to pick up a part by suction action at a transfer point at which the suction pad dwells temporarily, the suction pad being moved by appropriate actuating means from the transfer point to a delivery point and back to the transfer point, cycle after cycle, and wherein suction is periodically created at a pad by a pump, the pump having a reciprocable element which forms one wall of an expansible chamber which communicates, by means of a conduit, with the suction pad, a cam which turns in accurately timed relation with the pad actuating means, a spring tending to move the reciprocable element of the pump thereby to create suction at the transfer pad, and motion-transmitting means interposed between the cam and said reciprocable element of the pump, the cam being so contoured as normally to prevent actuation of said movable part by the spring but to allow maximum motion of said reciprocable part of the pump by the spring and thereby to create maximum suction just as the suction pad arrives at the transfer point.

6. Suction creating means for use in creating suction at a suction pad designed to pick up a part by suction action at a transfer point at which the suction pad dwells temporarily, the suction pad being moved by appropriate actuating means from the transfer point to a delivery point and back to the transfer point, cycle after cycle, and wherein suction is periodically created at the pad by a pump, the pump having a reciprocable element which forms one wall of an expansible chamber which communicates, by means of a conduit, with the suction pad, a cam which turns in accurately timed relation to the pad actuating means, a spring which tends constantly to move the reciprocable element of the pump in a direction to create suction at the transfer pad, and motion-transmitting means interposed between the cam and said reciprocable pump element, the cam having a dwell portion which normally prevents suction-creating motion of the reciprocable pump element, the cam also comprising a steeply sloping drop portion which permits sudden movement of said reciprocable pump element by the spring thereby substantially instantaneously to create maximum suction, said drop portion of the cam being so located that said sudden motion of the pump element occurs just as the suction pad arrives at the transfer position.

7. Suction creating means for use in creating suction at a pneumatic transfer pad designed to pick up a part, by suction action, at a transfer point at which the transfer pad dwells temporarily and wherein a main shaft drives actuating means for moving the pad from the transfer point to the delivery point and back to the transfer point, cycle after cycle, and wherein means, driven by a jack shaft, actuates the movable head of a bellows type pump thereby periodically creating suction at the pad, the bellows having a fixed head and a movable head, the interior of the bellows being connected by a conduit with the pneumatic transfer pad, said suction creating means comprising, in combination, means connecting said shafts to turn in accurate one-to-one ratio, a cam on the jack shaft, a spring tending to move the movable head of the bellows so as to expand the bellows and thereby to create suction at the transfer pad, and means for transmitting motion from the cam to the movable head of the bellows thereby to contract the bellows, the cam having a dwell portion operative to prevent expansion of the bellows until the transfer pad is substantially at the transfer position and having a steeply sloping drop portion arranged to permit the spring suddenly to expand the bellows and thereby create maximum suction just as the transfer pad arrives at the transfer position.

8. Suction creating means for use in creating suction at a pneumatic transfer pad designed to pick up a part, by suction action, at a transfer point at which the transfer pad dwells temporarily and wherein a main shaft drives actuating means for moving the pad from the transfer point to the delivery point and back to the transfer point, cycle after cycle, and wherein means, driven by a jack shaft, actuates the movable head of a bellows type pump, thereby periodically creating suction at the pad, gearing between the main shaft and jack shaft operative to turn the latter in one-to-one ratio to the main shaft, a disk fixed to the jack shaft, a cam mounted on the jack shaft adjacent to the disk, the cam being rotatively adjustable relatively to the disk, means for holding the cam and disk in relatively fixed, adjusted position, a spring tending to expand the bellows thereby to create suction at the transfer pad, a lever comprising a plurality of arms, rigid means connecting one arm to the movable head of the bellows, and a part provided with a cam follower roll mounted on another arm of the lever, the cam being contoured to permit the spring to expand the bellows to its maximum extent and thereby to create maximum suction just at the instant at which the transfer pad arrives at the transfer position.

9. Suction creating means of the kind wherein the interior of a bellows, having a movable head, is connected by a conduit with a suction pad, said suction creating means comprising in combination, a spring which constantly tends to move the movable head of the bellows so as to expand the latter and so create suction at the suction pad, a constantly rotating shaft and means carried thereby which is operative to resist such action of the spring throughout the major portion of a rotation of said shaft but which is constructed and arranged suddenly to release the spring from restraint at a predetermined point in the rotation of said shaft thereby to permit the spring to expand the bellows to its maximum extent and thereby to create maximum suction just at the instant at which the transfer pad arrives at the transfer position.

10. Apparatus of the class described wherein a frame supports a power driven main shaft, and a picker and a pneumatic transfer pad each actuated in properly timed relation by cams on the main shaft, a bellows having a fixed head and a movable head, the interior of the bellows being connected by a conduit with the pneumatic transfer pad, in combination, a spring which constantly tends to move the movable head of the bellows in a direction to expand the bellows and thereby create suction at the transfer pad, a rotary cam arranged to resist such action of the spring throughout a major portion of the rotation of the cam, the cam being so contoured as, at a predetermined point in its rotation, suddenly to release the spring from restraint thereby to permit the spring suddenly to expand the bellows to its maximum extent and thereby to create maximum suction just at the instant that the transfer pad arrives at the transfer position.

11. Suction creating means of the kind which includes a bellows pump having a movable head and wherein a constantly rotating shaft has a cam fixed thereto, means whereby the cam may be initially adjusted relatively to the shaft, a spring tending to expand the bellows, a lever having a plurality of arms, a rigid link connecting one of the lever arms to the movable head of the bellows, a latch pivotally connected to another arm of the lever, a cam follower roll carried by the latch and engageable with the cam, a spring tending to move the latch, stop means for limiting such motion of the latch so that the pivotal axis of the latch and of the cam follower roll normally lie in a plane close to but slightly spaced from a parallel plane through the axis of the cam, the cam comprising a concentric dwell portion and a steeply inclined drop portion, the latter being so located as to permit the spring suddenly to expand the bellows to maximum extent at an accurately predetermined point in the rotation of the shaft.

12. In apparatus of the class described a bellows having a fixed head and a movable head, means for supporting the fixed head, the latter having provision for attachment of a conduit for connecting the interior of the bellows with a device at which suction is to be created, a rigid link secured at one end to the movable head of the bellows, a lever having a plurality of arms, pivot means connecting one lever arm to the opposite end of said rigid link, a spring connected to another arm of the lever and which constantly tends to rock the lever thereby to expand the bellows, a latch member pivotally connected to another arm of the lever, a cam follower roll pivotally mounted on the free end of the latch member, a cam which contacts said cam follower roll, stop means for so positioning the latch that the pivotal axes of the latch and the cam follower roll normally lie in a horizontal plane slightly above the horizontal plane of the axis of the cam, spring means tending to hold the latch in contact with said stop means, the cam having a concentric dwell portion and a steeply inclined drop portion, and means for rotating the cam.

13. Suction creating means for use in creating suction at a suction pad designed to pick up a part by suction action at a transfer point at which the suction pad dwells temporarily, the suction pad being moved by appropriate actuating means from the transfer point to a delivery point and back to the transfer point, cycle after cycle, and wherein suction is periodically created at the pad by a pump, having a reciprocable part said suction-creating means comprising, in combination, a spring which tends to move said reciprocable pump part in one direction, a rotary cam which turns in accurately timed relation to the pad-actuating means for determining the time, in the cycle of operation of the pad, at which said reciprocable pump part may be moved by the spring, and motion-transmitting means controlled by the cam, the cam and said motion-transmitting means being so constructed and arranged that the pump establishes maximum suction at the pad at the instant at which the latter arrives at the transfer point.

14. Suction creating means for use in creating suction at a pneumatic transfer pad designed to pick up a part, by suction action, at a transfer point at which the transfer pad dwells temporarily and wherein a main shaft drives actuating means for moving the pad from the transfer point to the delivery point and back to the transfer point, cycle after cycle, and wherein means, driven by a jack shaft, actuates the movable head of a bellows type pump, thereby periodically creating suction at the pad, said suction creating means comprising means for turning the two shafts in accurate one-to-one ratio, a cam on the jack shaft, a spring tending to move the movable head of the bellows pump so as to expand the bellows and thereby to create suction at the pad, and means for transmitting motion from the cam to the movable head of the bellows thereby to contract the bellows, the cam having a dwell portion operative to prevent expansion of the bellows until the suction pad is substantially at the transfer point and having a steeply sloping drop portion arranged to permit the spring suddenly to expand the bellows and thereby suddenly to create maximum suction just at the instant at which the pad arrives at the transfer point.

SIDNEY T. CARTER.

References Cited in the file of this patent

UNITED STATES PATENTS

| Number | Name | Date |
|---|---|---|
| 343,857 | Richards | June 15, 1886 |
| 1,492,492 | Talbot | Apr. 29, 1924 |
| 1,693,965 | Smith et al. | Dec. 4, 1928 |
| 2,005,070 | Bitzer | June 18, 1935 |
| 2,528,944 | Carter | Nov. 7, 1950 |